United States Patent [19]

Hasegawa

[11] Patent Number: 4,938,177
[45] Date of Patent: Jul. 3, 1990

[54] INTAKE SYSTEM OF MULTICYLINDER INTERNAL COMBUSTION ENGINE

[75] Inventor: Masahi Hasegawa, Fujisawa, Japan
[73] Assignee: Isuzu Motors Limited, Tokyo, Japan
[21] Appl. No.: 422,528
[22] Filed: Oct. 17, 1989
[51] Int. Cl.[5] ............................................ F02M 35/00
[52] U.S. Cl. .............................................. 123/52 MV
[58] Field of Search .......... 123/52 M, 52 MV, 52 MB, 123/52 MC

[56] References Cited

U.S. PATENT DOCUMENTS

| | | | |
|---|---|---|---|
| 3,796,048 | 3/1974 | Annus et al. | 123/52 M |
| 4,064,696 | 12/1977 | Cser | 123/52 M |
| 4,300,488 | 11/1981 | Cser | 123/52 MB |

Primary Examiner—David A. Okonsky
Attorney, Agent, or Firm—Jones, Tullar & Cooper

[57] ABSTRACT

The intack system of multicylinder internal combustion engine with two rows of cylinders, constructed in accordance with the invention, includes a throttle valve unit provided on the side of either row of the engine cylinders and two intake air passages of different length leading to the two cylinder rows, one passage for the first cylinder row having a first resonance portion and the other passage for the second cylinder row having a second resonance portion nearly equal in length to said first resonance portion and a pressure wave inversion portion extending from said second resonance portion at least to the upstream-side end where said two passages separate from each other and having a cross-sectional area that allows inversion of intake pressure waves. The present invetnion accordingly makes the effects of resonance supercharging in the two resonance portions nearly equal, and the volumetric efficiency shows only one peak in low engine speed corresponding to the occurrence of resonance supercharging. Therefore, the deviation of intake air distribution is minimized and the variations of generating torque from the cylinders are reduced, so as to ensue smaller engine vibrations and a better feeling of vehicle operation.

4 Claims, 3 Drawing Sheets

INTAKE SYSTEM OF MULTICYLINDER INTERNAL COMBUSTION ENGINE

BACKGROUND OF THE INVENTION (1) Technical Field of the Invention

This invention relates to an air intake system of a multicylinder internal combustion engine.

(2) Prior Art

Some of conventional multicylinder internal combustion engines include an intake system equipped with an intake passage having resonance portions for the two rows of the engine cylinders and a throttle valve unit installed near the outside or upper portion of one of the two cylinder rows due to the layout restriction depending on the type of the engine or the limitations of vehicle installation. The intake passage therefore consists of resonance portions which differ in length.

Figure 2:
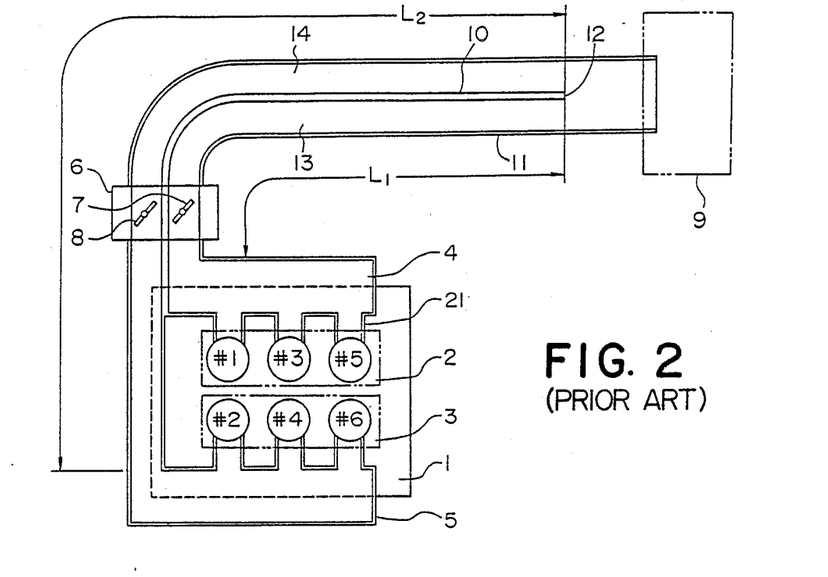
FIG. 2 is a schematic view of a conventional intake system of the multicylinder internal combustion engine.

For instance, a V-type multicylinder internal combustion engine 1 with two banks, shown in the FIG. 2, includes two rows of cylinders, one row having cylinders #1, #3, #6 and the other having cylinders #2, #4, #6. Combustion does not take place sequentially in the three cylinders of the same row. The cylinders are connected via surge tanks 4, 5 to a throttle valve unit 6 provided near the outside or top portion of the cylinder row 2 in the engine 1. The throttle valve unit 6 has two internal paths where twin throttle valves 7, 8 are provided, respectively. The valves are capable of performing synchronous rotation, that is, the vavles can rotate together at the same time and in the same degree.

An intake passage 11 extending from the unit 6 to the air cleaner 9, has a separating wall which divides the pipe's internal passage into two separate sections.

In the case of said intake passage 11, even if the cross-sectional areas $S_1$, $S_2$ of resonance portions 13, 14 extending from the wall end 12 fo the separating wall 10 to the surge tanks 4, 5, respectively are made equal, it is inevitable to set the length $L_1$ of resonance portion 13 connected to the cylinder row 2 to a length smaller than the length $L_2$ of resonance portion 14 connected to the other cylinder row 3, because the throttle valve unit 6 is provided on the side of the cylinders of the row 2 in the engine.

Figure 3:
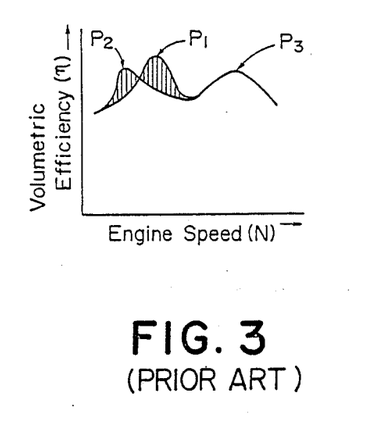
FIG. 3 is a volumetric efficiency diagram of the conventional system.

FIG. 3 shows the volumetric efficiency $\eta$ relative to the engine speed N of the engine 1 with the resonance pipes 13, 14 of different length. As obviously shown, the peak volumetric efficiency $\eta$ in lower engine speed range as a result of resonance supercharging effect is separated into two peaks; the $P_1$ by the cylinder row 2 and the $P_2$ by the row 3. The deviation of intake air distribution between the two cylinder rows can lead to variations of generating torque from the cylinders between the two rows, increased engine vibrations and a poor feeling of vehicle driving.

Especially in gasoline engines, the control by calculation of fuel flow rate based on the total air flow rate in the engine as a whole does not serve to ensure a constant fuel-air ratio for each cylinder, because of the difference in volumetric efficiency between the cylinders. This results in an increase of harmful components in exhaust gases, in addition to the above mentioned variations of generating torque.

The peak volumetric efficiency $P_3$ in the characteristic curve supercharging, shown in FIG. 3 corresponds to the occurrence of inertia in high engine speed, of the inlet passage 21 which connects the surge tank to each cylinder.

Japanese patent unexamined publication No. 55-19976 discloses a proposed intake system for elimination of the deviated distribution of intake air over two rows of engine cylinders. It includes resonance passage portions of different length connected to the two cylinder rows. These portions have different sectional areas for correcting the length difference to attain resonance speed synchronism. However, the volumetric efficiency when inertia supercharging takes place does not show the same value between the two cylinder rows. Therefore, the proposed system does not provide a satisfactory result to eliminate the problem of deviated air distribution.

OBJECT OF THE INVENTION

Accordingly, it is an object of this invention to provide an intake system of a multicylinder internal combustion engine having two or more rows of cylinders which can overcome the above described problems of the conventional system by preventing the separation of peak volumetric efficiency into two ones as well as the deviation of intake air distribution, due to the effect of resonance supercharging in the multicylinder internal combustion engine's low-speed range, and by reducing variations of generating torque from the cylinders and resultant engine vibrations for a better feeling of vehicle driving.

DETAILED DESCRIPTION OF THE INVENTION

The first embodiment of the present invention is described below in detail with reference to the accompanying drawings, especially FIG. 1 and FIG. 4.

Figure 1:
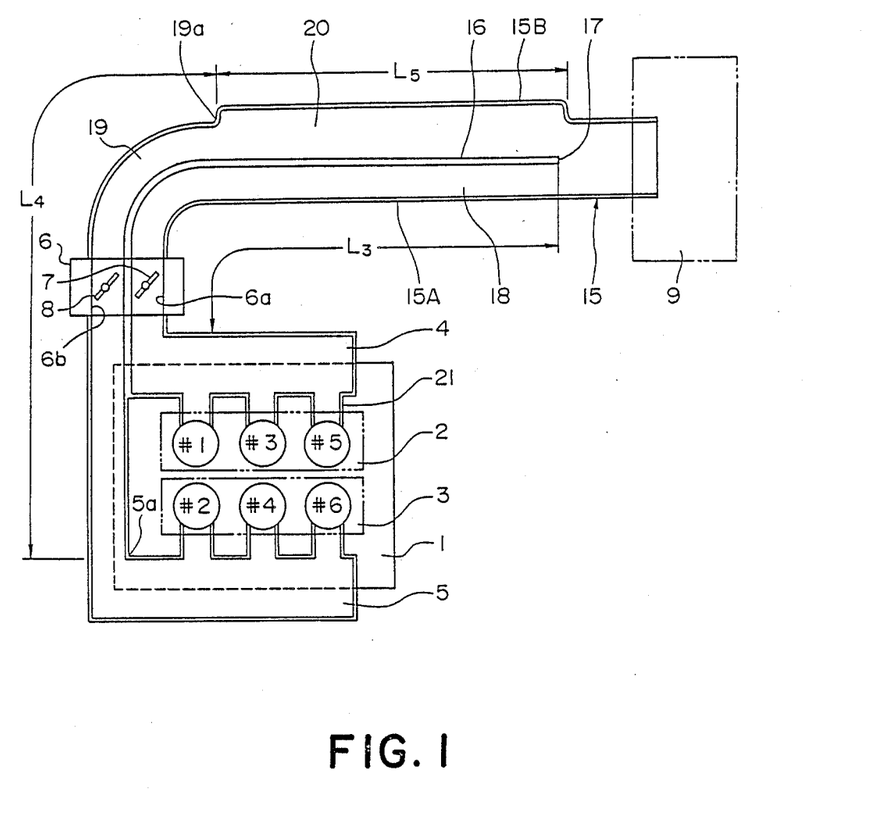
FIG. 1 is a schematic view of the air intake system of the multicylinder internal combustion engine, which shows the first embodiment of the present invention.

Referring to FIG. 1, a V-type multicylinder internal combustion engine 1 with two banks consists of two rows of cylinders; one cylinder row 2 including cylinders #1, #3, #5 and the other cylinder row 3 including cylinders #2, #4, #6.

Surge tanks 4, 5 are provided to the two cylinder groups 2, 3, respectively, and operate for uniform distribution of intake air to the cylinders as well as for adjustment of resonance supercharging.

A throttle valve unit 6 having twin throttle valves 7, 8 is installed near the outside or upper portion of the cylinder group 2 on one side of the engine 1 because of the engine type and the limitations of vehicle installation. Inside the unit 6, there are two intake air paths 6a, 6b where a throttle valve is provided respectively so as to enable synchronous rotation of the valves. An intake passage 15 is connected at one end to an air cleaner 9 and has two separate sections divided by a separating wall 16 which lead through the intake air paths 6a, 6b to surge tanks 4, 5 for the rows 2, 3, respectively.

One of the two sections of said intake passage 15 leading to the cylinder group 2, has a resonance portion 18 of length $L_3$ which extends from the end 17 of the wall 16 to the surge tank 4. The other section of said intake passage 15, leading to the cylinder group 3, includes a resonance portion 19 which extends from the connection end 5a for the surge tank 5, by a length $L_4$ nearly equal to the length $L_3$ of said portion 18. Said section of intake passage for the group 3 also includes a pressure wave inversion portion 20, extending from the end 19a of the resonance portion 19 at least to the wall end 17 of the separating wall 16, which has a cross-sectional area, about two times greater than the cross-sectional area $S_2$ of the resonance portion 19, that allows inversion of intake pressure waves.

The intake system of the multicylinder internal combustion engine, thus constructed in accordance with the invention, comprises an intake passage having two resonance portions of neary equal length leading to the cylinder rows 2, 3, one of said two portions having the pressure wave inversion portion 20, extending from the resonance portion 19 to the end of the separating wall 16, which has a sectional area that allows inversion of intake pressure waves. The volumetric efficiency $\eta$ therefore, as shown in FIG. 4, exhibits the sole peak $P_4$ in low engine speed which corresponds to the occurrence of resonance supercharging putting nearly the same effect on the resonance portions 18, 19. This helps minimize the deviation of intake air distribution and reduce the variations of generating torque by the two rows of cylinders, thereby resulting in decreased engine vibrations and a better feeling of vehicle operation.

Figure 4:
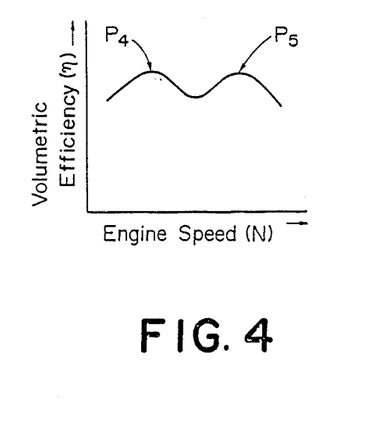
FIG. 4 is a volumetric efficiency diagram of the first embodiment of the invention.

The peak $P_5$ of the volumetric efficiency in high engine speed. shown in FIG. 4, corresponds to the occurrence of inertia supercharging in the inlet passage 21 which connects the surge tank to each cylinder. In the above embodiment, a multicylinder internal combustion engine with the surge tanks 4, 5 provided on the cylinder rows 2, 3 is described, but it should be understood to those skilled in the art that the present invention is also applicable to an internal combustion engine having no surge tank.

And, shown in the above embodiment is an example of the intake pipe including a pressure wave inversion portion 20 which extends from the resonance portion 19 to the upstream-side end 17 of the separating wall 16. It is obvious, however, that when necessary the portion 20 can be extended further beyond the wall end 17.

As in the foregoing, the intake system of multicylinder internal combustion engine according to the present invention includes a throttle valve unit provided on the side of one cylinder row of the two rows in the engine and an intake passage having first and second sections of different lenght separated by a separating wall leading to the two rows of cylinders, said first section for the cylinders of one row having a first resonance portion and said second section for the cylinders of the other row having a second resonance portion nearly equal in lenght to said first resonance portion and a pressure wave inversion portion extending from said second resonance portion at least to the upstream-side end of said separating wall and having a cross-sectional area that allows inversion of intake pressure waves.

The present invention accordingly makes the effects of resonance super-charging in the two separate sections of the intake pipe for the two cylinder rows nearly equal, and thereby prevents the peak volumetric efficiency from separating into two ones as well as reduces the deviation of intake air distribution, even when the layout restriction depending on the engine type or the limitations on vehicle installation requires the installation of the throttle valve unit on the side of the cylinders of one row in the engine and therefore the use of an intake passage having two sections of different length. Consequently, the intake system in accordance with the invention ensures smaller variations of generating torque from the two rows of cylinders and a better feeling of vehicle operation.

Figure 5:
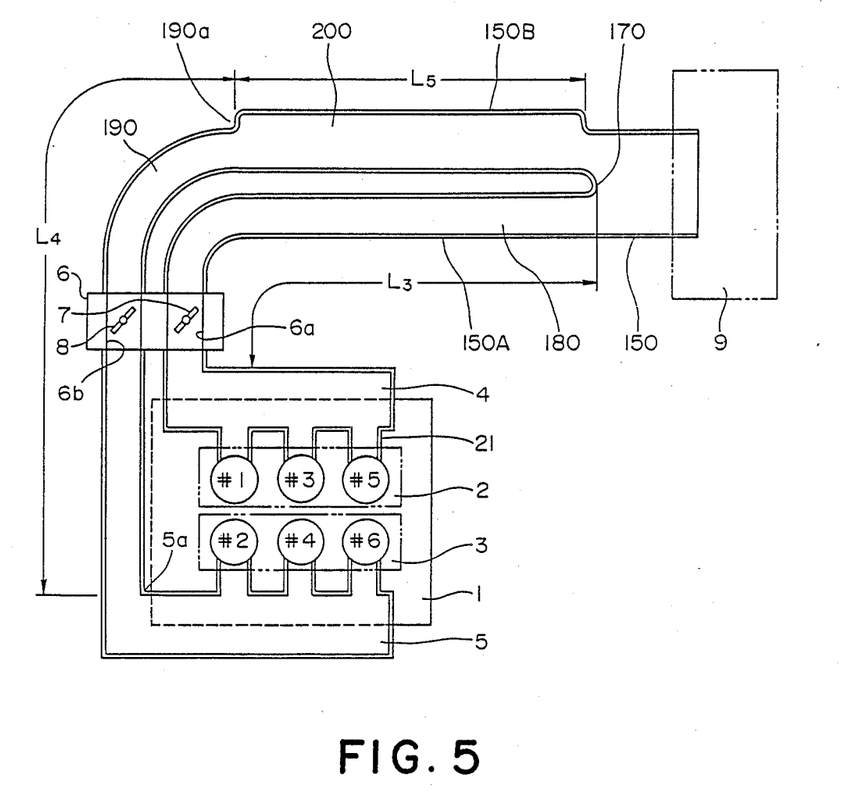
FIG. 5 is a schematic view of the second embodiment of the invention.

In addition, FIG. 5 shows the second embodiment of the present invention. An intake pipe 150 consists of two separate intake air pipes 150A, 150B which extend from the cylinder rows 2, 3 to the upstream-side end 170. The intake air pipe 150A for the cylinder row 2 comprises a first resonance portion 180 having the length $L_3$. The intake air pipe 150B for the cylinder row 3 comprises a second resonance portion 190 having a length $L_4$ nearyl equal to the length $L_3$, and a pressure wave inversion portion 200 which extends from the end 190a of the second resonance portion 190 at least to the upstream-side end 170 of the two pipes 150A, 150B and has a cross-secitonal area that allows inversion of intake pressure waves.

Obviously, the functions and effects of this embodiment are similar to those of the intake system of multicylinder internal combustion engine according to the above described first embodiment of the invention.

When compared with the first embodiment, the layout of the second embodiment's intake system in the engine can be more flexibly determined.

What is claimed is:

1. An intake system of a multicylinder internal combustion engine with first and second rows of cylinders comprising; a throttle valve unit provided on a side of either cylinder row, and first and second intake air passages, controlled by said valve unit, of different length leading to the two rows of cylinders, said first passage for the first cylinder row having a first resonance portion, and said second passage for the second cylinder row having a second resonance portion nearly equal in length to said first resonance portion and a pressure wave inversion portion extending from said second resonance portion at least to the upstream-side end where said two passages separate from each other and having a cross-sectional area that allows inversion of intake pressure waves.

2. An intake system of a multicylinder internal combustion engine with first and second rows of cylinders comprising; a throttle valve unit provided on a side of either cylinder row, and first and second intake air passages, controlled by said valve unit, of different length separated by a separating wall leading to the two rows of cylinders, said first passage for the first cylinder row having a first resonance portion, and said second passage for the second cylinder row having a second resonance portion nearly equal in length to said first resonance portion and a pressure wave inversion portion extending from said second resonance portion at least to the upstream-side end of said separating wall and having a cross-sectional area that allows inversion of intake pressure waves.

3. An intake system of a multicylinder internal combustion engine with first and second rows of cylinders comprising; a throttle valve unit provided on the side a of either cylinder row, and first and second intake air pipes, controlled by said valve unit, of different length leading to the two rows of cylinders, said first pipe for the first cylinder row having a first resonance portion, and said second pipe for the second cylinder row having a second resonance portion nearly equal in length to said first resonance portion and a pressure wave inversion portion extending from said second resonance portion at least to the upstream-side end where said two pipes separate from each other and having a cross-sectional area that allows inversion of intake pressure waves.

4. The intake system of multicylinder internal combustion engine according to claim 1, claim 2 or claim 3, wherein the multicylinder internal combustion engine is a V-type engine with two banks having a plurality of cylinders.

* * * * *

UNITED STATES PATENT AND TRADEMARK OFFICE
CERTIFICATE OF CORRECTION

PATENT NO. : 4,938,177

DATED : July 3, 1990

INVENTOR(S) : Hasegawa

It is certified that error appears in the above-identified patent and that said Letters Patent is hereby corrected as shown below:

```
Column 1, line 40, change "to set" to --that--;
         line 41, change "to a length" to --will be--;
         line 49, after "in" insert --the--;
         line 50, after "range" insert a comma (--,--);
         line 50, after "of" insert --a--;
         line 50, after "effect" insert a comma (--,--);
         line 51, after "the" (first occurrence) insert
--peak--;
         line 52, after "the" (first occurrence) insert
--peak--;
         line 56, change "driving" to --driveability--.
         line 67, change "in" to --at--.
```

UNITED STATES PATENT AND TRADEMARK OFFICE
CERTIFICATE OF CORRECTION

PATENT NO. : 4,938,177          Page 2 of 7

DATED      : July 3, 1990

INVENTOR(S): Hasegawa

It is certified that error appears in the above-identified patent and that said Letters Patent is hereby corrected as shown below:

Column 2, line 3, change "patent unexamined" to --unexamined patent--;

line 23, change "ones as well as" to --peaks, as well as preventing--;

line 33, change "the" to --a--;

line 34, "the" (first occurrence) to --a--;

line 36, change "the" to --a--;

line 37, change "the" to --a--;

line 41, change "the" to --a--;

line 53, change "provided to" to --provided for--;

line 54, change "operate for" to --operate to provide--;

line 62, cancel "a throttle valve is" and substitute --throttle valves 7 and 8 respectively are--;

UNITED STATES PATENT AND TRADEMARK OFFICE
CERTIFICATE OF CORRECTION

PATENT NO. : 4,938,177  Page 3 of 7
DATED : July 3, 1990
INVENTOR(S) : Hasegawa

It is certified that error appears in the above-identified patent and that said Letters Patent is hereby corrected as shown below:

line 62, cancel "respectively" and substitute --and are arranged--.
Column 3, line 13, cancel the comma (--,--);
       line 19, change "neary" to --nearly--;
       line 25, change "the" to --a--;
       line 27, after "supercharging" insert a comma (--,--);
       line 29, before "minimize" insert --to--;
       line 30, before "reduce" insert --to--;
       line 43, change "And," to --Also--;
       line 68, change "into two ones" to --into two parts--.
Column 4, line 5, after "and" insert --requires--;
       line 11, change "the" to --a--.

UNITED STATES PATENT AND TRADEMARK OFFICE
CERTIFICATE OF CORRECTION

PATENT NO. : 4,938,177
DATED : July 3, 1990
INVENTOR(S) : Hasegawa

It is certified that error appears in the above-identified patent and that said Letters Patent is hereby corrected as shown below:

IN THE CLAIMS:

Cancel claims 1 through 3 and substitute the following:

--1. An intake system of a multicylinder internal combustion engine with first and second rows of cylinders, comprising: a throttle valve unit provided on a side of either cylinder row, and first and second intake air passages controlled by said valve unit, said air passages being of different lengths and leading from an upstream end to the first and second rows of cylinders, respectively, said first passage for the first cylinder row having a first resonance portion, and said second passage for the second cylinder row having a second resonance portion nearly equal in length to said resonance portion and further having a pressure wave inversion portion extending from said second resonance portion at least to said upstream end where said first and second intake air passages separate from each other, said inversion portion having a cross-sectional area that allows inversion of intake pressure waves.

UNITED STATES PATENT AND TRADEMARK OFFICE
CERTIFICATE OF CORRECTION

PATENT NO. : 4,938,177
DATED : July 3, 1990
INVENTOR(S) : Hasegawa

It is certified that error appears in the above-identified patent and that said Letters Patent is hereby corrected as shown below:

--2. An intake system of a multicylinder internal combustion engine with first and second rows of cylinders comprising: a throttle valve unit provided on a side of either cylinder row, and first and second air intake passages controlled by said valve unit, said air passages being of different lengths and separated by a separating wall leading from an upstream end to the first and second rows of cylinders, respectively, said first passage for the first cylinder row having a first resonance portion, and said second passage for the second cylinder row having a second resonance portion and a pressure wave inversion portion extending from said second resonance portion at least to the upstream end of said separating wall and having a cross-sectional area that allows inversion of intake pressure waves.

UNITED STATES PATENT AND TRADEMARK OFFICE
CERTIFICATE OF CORRECTION

PATENT NO. : 4,938,177

DATED : July 3, 1990

INVENTOR(S) : Hasegawa

It is certified that error appears in the above-identified patent and that said Letters Patent is hereby corrected as shown below:

--3. An intake system of a multicylinder internal combustion engine with first and second rows of cylinders comprising: a throttle valve unit provided on a side of either cylinder row, and first and second intake air pipes controlled by said valve unit, said air pipes being of different lengths and leading from an upstream end to the first and second rows of cylinders, respectively, said first pipe for the first cylinder row having a first resonance portion, and said second pipe for the second cylinder row having a second resonance portion nearly equal in length to said first resonance portion and a pressure wave inversion portion extending from said second resonance portion at least to the upstream end where said two pipes--

UNITED STATES PATENT AND TRADEMARK OFFICE
CERTIFICATE OF CORRECTION

PATENT NO. : 4,938,177

DATED : July 3, 1990

INVENTOR(S) : Hasegawa

It is certified that error appears in the above-identified patent and that said Letters Patent is hereby corrected as shown below:

```
separate from each other and having a cross-sectional area that
allows inversion of intake pressure waves.--
```

Signed and Sealed this

Twenty-second Day of October, 1991

Attest:

HARRY F. MANBECK, JR.

*Attesting Officer*   *Commissioner of Patents and Trademarks*